United States Patent

Theobald

[19]

[11] Patent Number: 6,082,652

[45] Date of Patent: Jul. 4, 2000

[54] INDEPENDENT DOUBLE HUB TAKE-UP REEL ARRANGEMENT FOR USE WITH A SINGLE REEL CARTRIDGE TAPE DRIVE

[75] Inventor: William L. Theobald, Newport Beach, Calif.

[73] Assignee: Seagate Technology, Inc., Scotts Valley, Calif.

[21] Appl. No.: 08/966,195

[22] Filed: Nov. 7, 1997

Related U.S. Application Data

[60] Provisional application No. 60/048,268, Jun. 2, 1997.

[51] Int. Cl.$^7$ ...................................................... G03B 1/58
[52] U.S. Cl. .................................... 242/332.4; 242/332.8; 242/532.1; 242/532.6; 242/532.7
[58] Field of Search ............................. 242/332.4, 332.7, 242/332.8, 532.1, 532.6, 532.7, 582

[56] References Cited

U.S. PATENT DOCUMENTS

| | | | |
|---|---|---|---|
| 3,664,607 | 5/1972 | Trefzger et al. | 242/332.4 |
| 4,330,096 | 5/1982 | Bartel et al. | 242/532.1 |
| 4,477,851 | 10/1984 | Dalziel et al. | 242/332.4 X |
| 4,608,614 | 8/1986 | Rinkleib et al. | 242/322.4 X |
| 4,646,177 | 2/1987 | Sanford et al. | 242/332.4 X |
| 5,219,129 | 6/1993 | Spicer et al. . | |
| 5,542,620 | 8/1996 | Ohshita | 242/332.4 |

FOREIGN PATENT DOCUMENTS

| | | | |
|---|---|---|---|
| 1547015 | 10/1969 | Germany | 242/332.4 |
| 1114950 | 6/1986 | Japan | 242/532.6 |
| 716632 | 10/1954 | United Kingdom | 242/332.4 |
| 1167445 | 10/1969 | United Kingdom | 242/332.4 |

OTHER PUBLICATIONS

Van den Burg, "Cartridge and Self–Threading Recorder", IBM Technical Disclosure Document vol. 10, No. 2, Jul. 1967.

*Primary Examiner*—Donald P. Walsh
*Assistant Examiner*—William A. Rivera
*Attorney, Agent, or Firm*—McDermott, Will & Emery

[57] ABSTRACT

A take-up leader is wound onto an inner driven hub of a take-up reel until a take-up link, which is connected to the end of the take-up leader, is pulled into a recess defined between the inner driven hub and a free-wheeling outer hub and abuts a stopper feature formed on the outer hub member. The inner hub is operatively connected to the outer abutment on the hub and both undergo synchronous rotation. A cartridge link, connected to the take-up link, is also drawn into the recess. The end surface of the cartridge link has a curved shape formed essentially contiguous with the outer periphery of the outer hub. A cartridge leader, which is connected to the cartridge link, is then induced to wind onto the outer periphery of the outer hub with essentially no loss of circularity. The cartridge leader can be made of the same material as the take-up leader, or can be an extension of the magnetic tape which is stored in the cartridge.

11 Claims, 9 Drawing Sheets

INDEPENDENT DOUBLE HUB TAKE-UP REEL ARRANGEMENT FOR USE WITH A SINGLE REEL CARTRIDGE TAPE DRIVE

This application claims priority from provisional patent application Ser. No. 60/048,268 filed on Jun. 2, 1997, the entire disclosure of which is hereby incorporated by reference herein.

BACKGROUND OF THE INVENTION

1. Field of the Invention

The present invention relates to a tape arrangement which includes a single reel cartridge and, more specifically, to a tape drive arrangement which has a take-up hub construction that facilitates reeling in and promotes the formation of highly circular tape windings on the take-up hub.

2. Description of the Related Art

A number of single reel cartridge/drive arrangements have been proposed. However, most of these single reel cartridge/drive arrangements are directed to mass storage systems, such as the IBM 3480 system, and/or are associated with mass storage arrangements, such as mentioned in U.S. Pat. No. 4,972,277 to Sills et al. and U.S. Pat. No. 5,454,681 to Baur. Examples of the cartridge/drive arrangements used in the above mentioned systems can be found in U.S. Pat. No. 5,202,809 to Dodt et al.; U.S. Pat. No. 5,155,639 to Platter et al.; U.S. Pat. No. 4,987,504 to Inoue; U.S. Pat. No. 4,826,101 to Smith, and. U.S. Pat. No. 4,679,747 to Smith;.

However, these single reel cartridge/drive arrangements tend to be both complex and bulky due to the manner in which the ends of the tapes are captured by a pivotal arm type of arrangement upon insertion of a cartridge into a drive. This bulkiness is not a particularly significant problem in mass storage systems wherein the banks of tapes dwarf the tape drive; however, bulkiness tends to inhibit their use in personal computing systems. That is to say, these types of arrangements cannot be readily incorporated into the relatively small housing (often referred to as a "tower") associated with personal computers in which the CPU, hard disc, floppy disc, CD drives etc., are enclosed.

Accordingly, there is a need for a highly compact arrangement wherein so called "streamer" types of tape and the like, can be withdrawn from a single reel cartridge and threaded into an operative configuration in the drive, ready for the transfer of large quantities of data.

SUMMARY OF THE INVENTION

It is an object of the present invention to provide a compact tape drive arrangement which enables tape to drawn out of a single reel cartridge after its insertion into the drive, and to be wound onto a take-up hub with a high degree of circularity.

It is a further object of the present invention to provide a take-up hub arrangement which enables a flexible leader to be reeled into an interior portion of the hub, leaving the external periphery of the hub free of undulations, thereby improving the circularity of the tape windings.

The above objects are achieved by an arrangement wherein a take-up leader is wound onto an inner driven hub of a take-up reel until a take-up link, connected to the end of the take-up leader, is pulled into a recess defined between the inner driven hub and a free-wheeling outer hub, and abuts a stopper feature formed on an inner surface of the outer hub member. Upon this abutment, the inner hub becomes operatively connected with the outer hub and both undergo synchronous rotation.

A cartridge link which is connected to the take-up link is also drawn into the recess. The end surface of the cartridge link has a curved shape formed to be essentially contiguous with the outer periphery of the outer hub. A cartridge leader, which is connected to the cartridge link, is then induced to wind onto the outer periphery of the outer hub with essentially no loss of circularity. The cartridge leader can be made of the same material as the take-up leader, or can be an extension of the magnetic tape which is stored in the cartridge.

More specifically, a first aspect of the present invention is a take-up reel for a tape drive. The reel includes an inner hub, and a flexible leader connected at one end to the inner hub so as to be wound onto the inner hub when driven to rotate by a motor. An outer hub member is disposed about the inner hub and arranged to be freely rotatable thereabout. The outer hub has an opening through which the flexible leader extends. A capture mechanism, including a link connected to a second end of the flexible leader, is capable of capturing a tape to be wound onto the outer hub. A stopper provided on an inner surface of the outer hub engages the link of the capture mechanism when the leader is wound onto the inner hub and causes the outer hub to rotate synchronously with the inner hub.

A second aspect of the present invention is a tape drive. The drive includes an inner hub selectively rotatable by a motor connected thereto. An outer hub is rotatably disposed about the inner hub and arranged to be freely rotatable with respect to the inner hub. A flexible take-up leader, having a first end connected to the inner hub and a second end connected to a take-up link member, captures an end of a magnetic tape. The take-up leader extends through an opening formed in the outer hub. A recess between the inner and outer hubs, which is contiguous with the opening in the outer hub, receives the take-up link when the flexible take-up leader is wound onto the inner hub. This allows the tape, which is drawn to the outer hub, to wind on the outer hub without circularity interference with the take-up link.

Additional objects, advantages and novel features of the invention will be set forth in part in the description which follows, and will become apparent to those skilled in the art upon examination of the following or may be learned by practice of the invention. The objects and advantages of the invention may be realized and attained by means of the instrumentalities and combinations particularly pointed out in the appended claims.

BRIEF DESCRIPTION OF THE DRAWINGS

The various features and advantages of the present invention will become more clearly appreciated as a detailed description of the embodiments of the present invention is given with reference to the appended figures wherein.

DETAILED DESCRIPTION OF THE PREFERRED EMBODIMENTS

Figure 1:
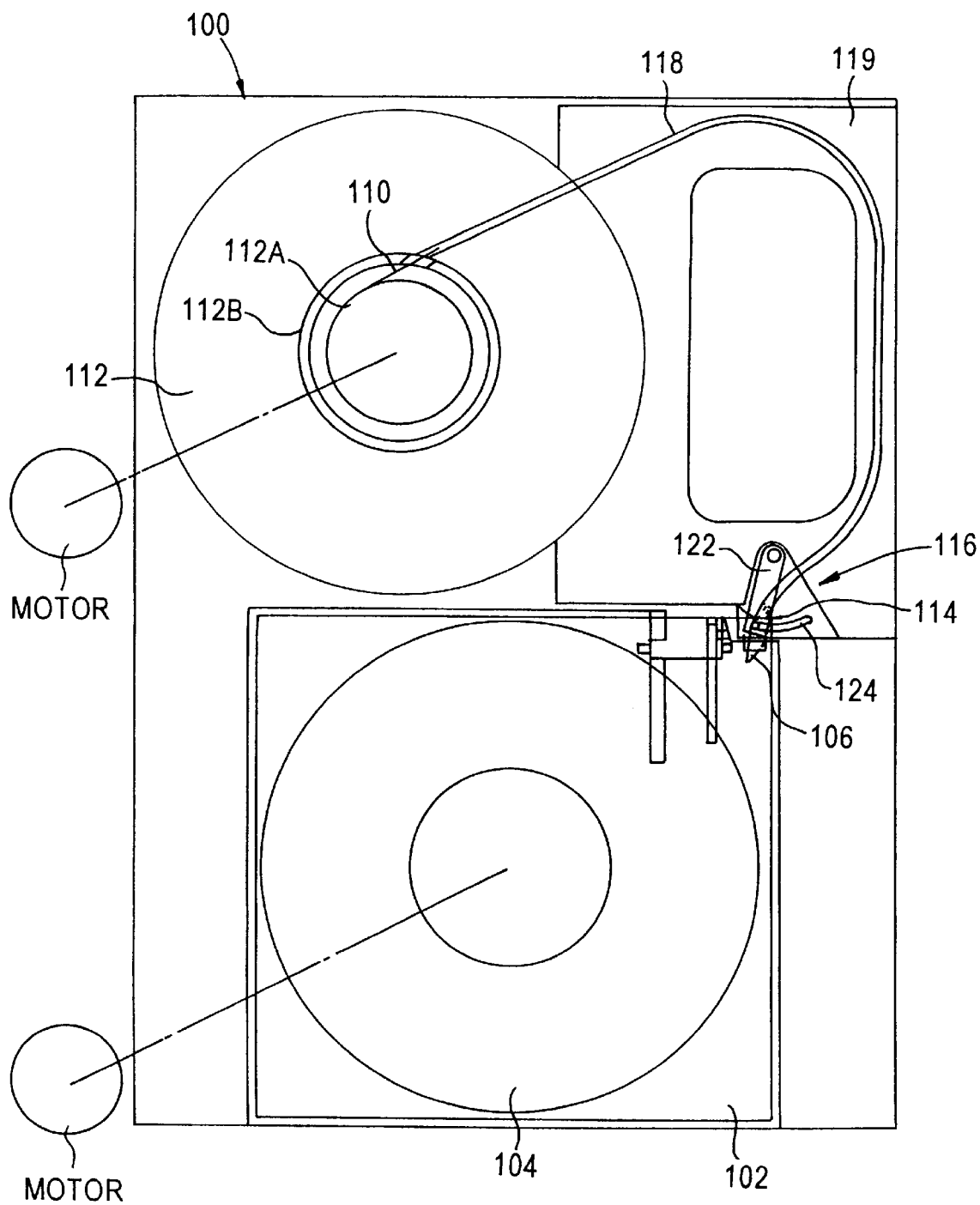
FIG. 1 is a plan view showing a disc drive arrangement which incorporates the take-up hub arrangement according to the present invention.

FIG. 1 shows a tape drive 100 which is equipped with an embodiment of the invention. In brief, this drive is adapted to receive a cassette or cartridge 102 which contains a rotatable supply reel 104. The magnetic tape which is wound on the supply reel 104 is connected with a cartridge link 106 by way of a flexible cartridge leader 108. This leader 108 can be made of a suitable flexible polymeric material such as mylar or the like. In this instance the thickness of the leader can be from 0.004–0.008 inches thick.

A flexible take-up leader 110, which is also made of a material of a similar nature and thickness as mentioned above, is connected between a take-up reel 112 and a take-up link 114. This take-up link is 114 adapted to be releasably connected or intercoupled with the cartridge link 106 by a connection mechanism generally denoted by numeral 116. Once intercoupled, the cartridge and take-up links 106, 114 are drawn along a pair of link guide tracks 118 (only one is shown) formed in link guide plates 119 which forms part of the tape drive 100, toward the take-up reel 112 by the rotation of the take-up reel 112 and the associated winding in of the take-up leader 110 onto the hub of the take-up reel.

Figure 7:
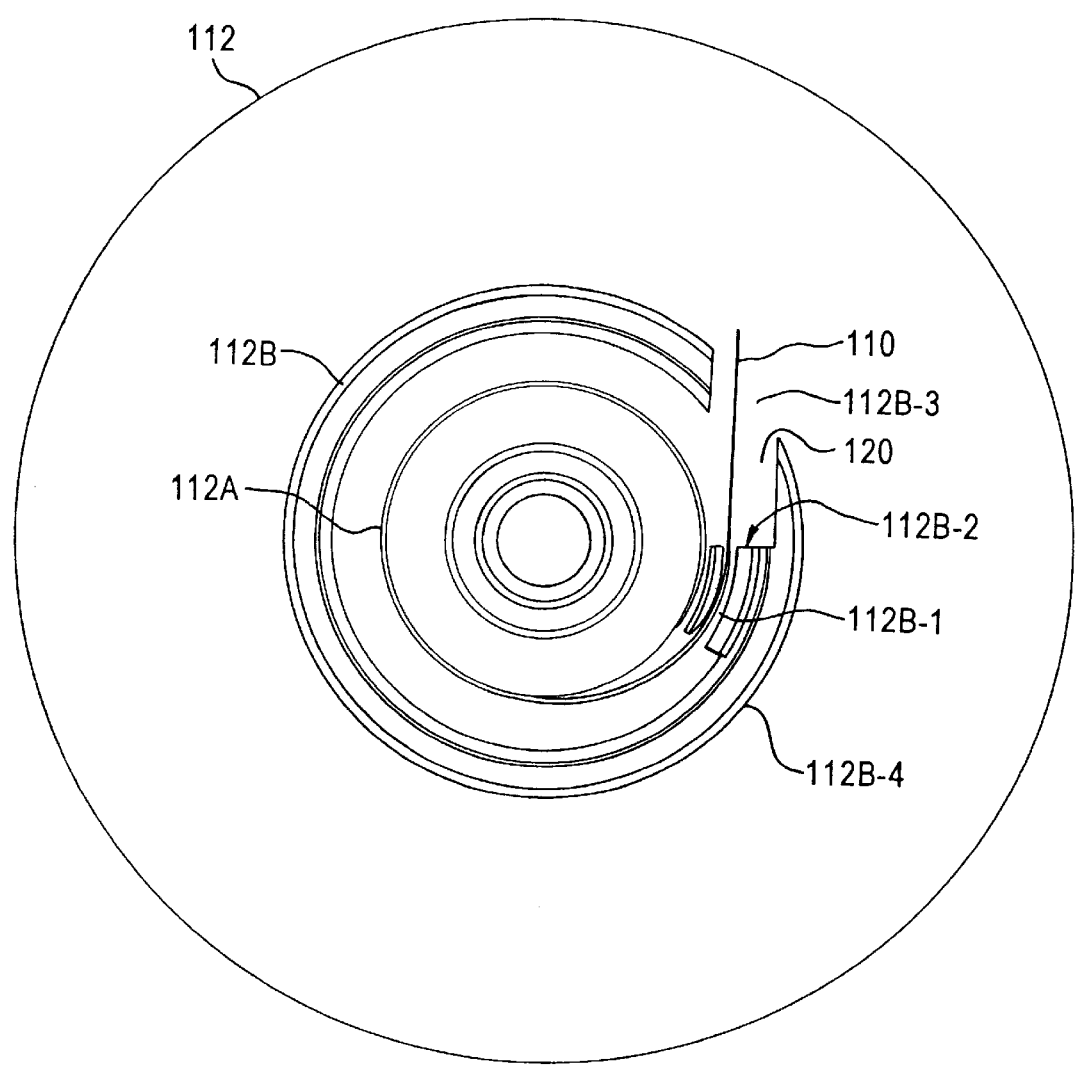
FIG. 7 is a plan view of the take-up hub according to the present invention depicting the manner in which the flexible take-up leader is wound on an inner hub member of the take-up hub arrangement, and arranged to extend out through an opening formed in an outer hub member of the take-up hub.
Figure 8:
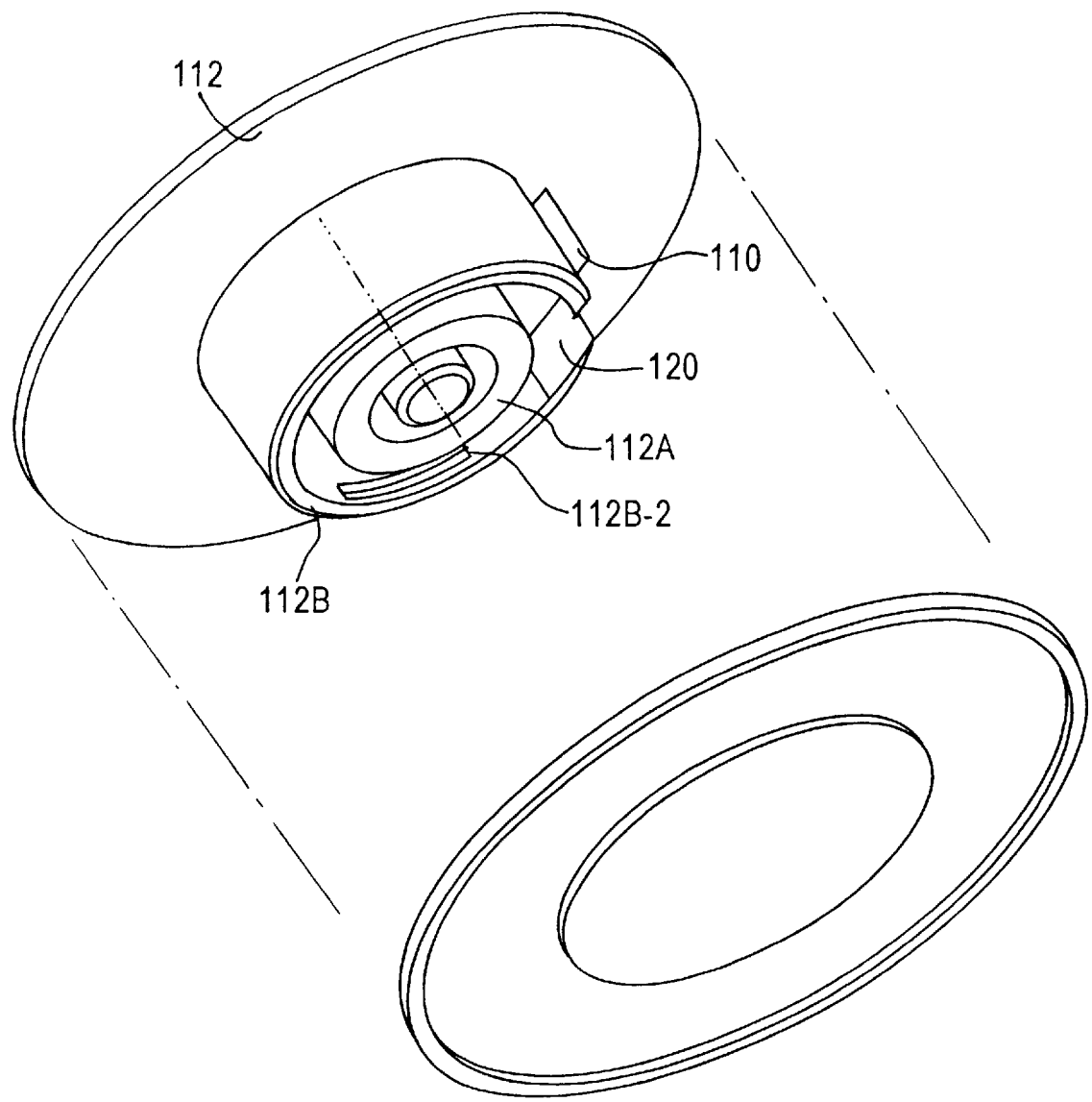
FIG. 8 is an exploded view showing constructional details of the take-up hub arrangement according to the present invention.

The take-up reel 112 has, in accordance with this invention, a dual inner/outer hub structure. The inner hub 112A is connected to a motor in a known manner so as to be selectively rotatable. The take-up leader 110 is, as best seen in FIG. 7, connected to the inner hub 112A so as to be wound thereon when the inner hub 112A is driven to rotate. The outer hub 112B is disposed about the inner hub 112A and arranged to be freely rotatable with respect to this member. The take-up leader 110 is arranged to extend through a slot 112B-1 formed in a stop feature 112B-2 which is integral with the outer hub 112B, and then pass out through an opening 112B-3 formed in the periphery of the outer hub 112B.

Figure 9:
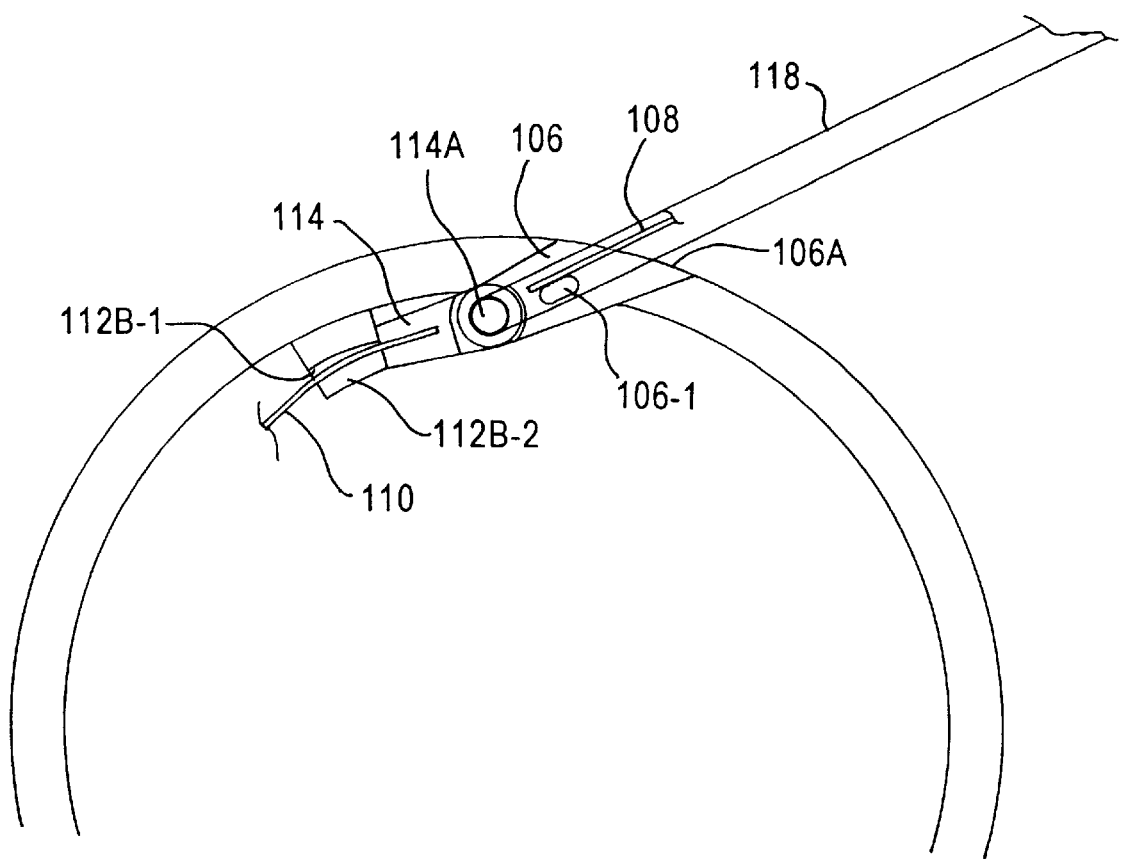
FIG. 9 is a plan view showing what happens when the take-up leader fully wound back onto the inner hub member and intercoupled take-up and cartridge links are tracted into a recess defined between the inner and outer hub members.

With this arrangement, when the take-up leader 110 has been wound in to the point that the take-up link 114 abuts against the stopper feature 112B-2, in the manner illustrated in FIG. 9, the outer hub 112B is induced to rotate synchronously with the inner one 112A. Accordingly, the cartridge leader 108, which is attached to the cartridge link 106 that is intercoupled with the take-up link 114, winds onto the outer periphery of the outer hub 112B. The trailing edge 106A of the cartridge link 106 has an arcuate shape (see FIGS. 3, 4 and 9). The shape is selected to become flush with the curved outer peripheral surface 112B-4 of the outer hub 112B when the intercoupled link arrangement is tracted into a shaped recess 120 (see FIG. 7) defined between the inner and outer hubs 112A, 112B. Consequently, the windings of the magnetic tape, which subsequently are wound onto the outer take-up hub, are smooth and circular.

Figure 2:
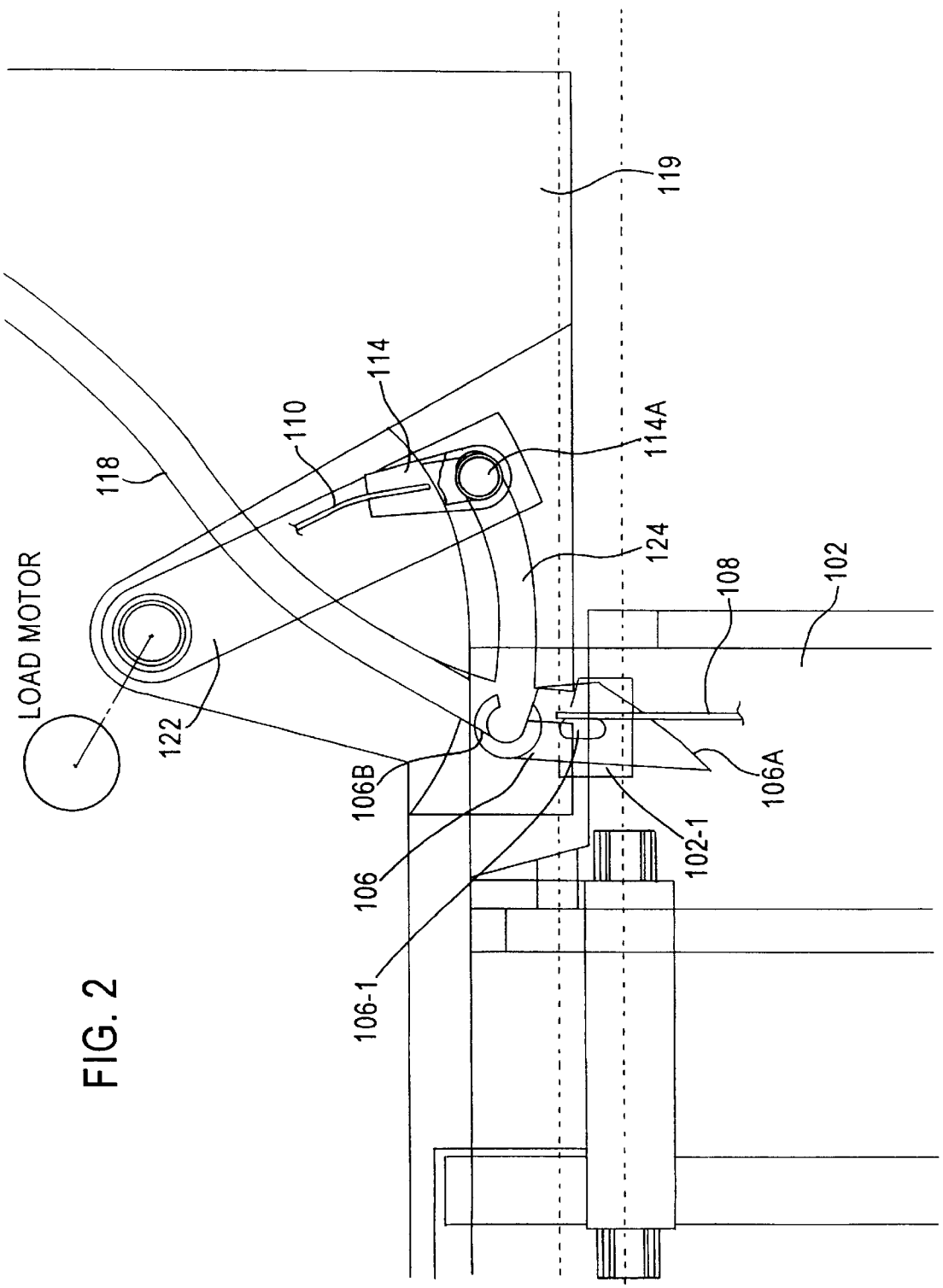
FIG. 2 shows a mechanism via which a take-up link and cartridge link are intercoupled when a magnetic tape cartridge is inserted into the disc drive in the manner illustrated in FIG. 1.
Figure 3:
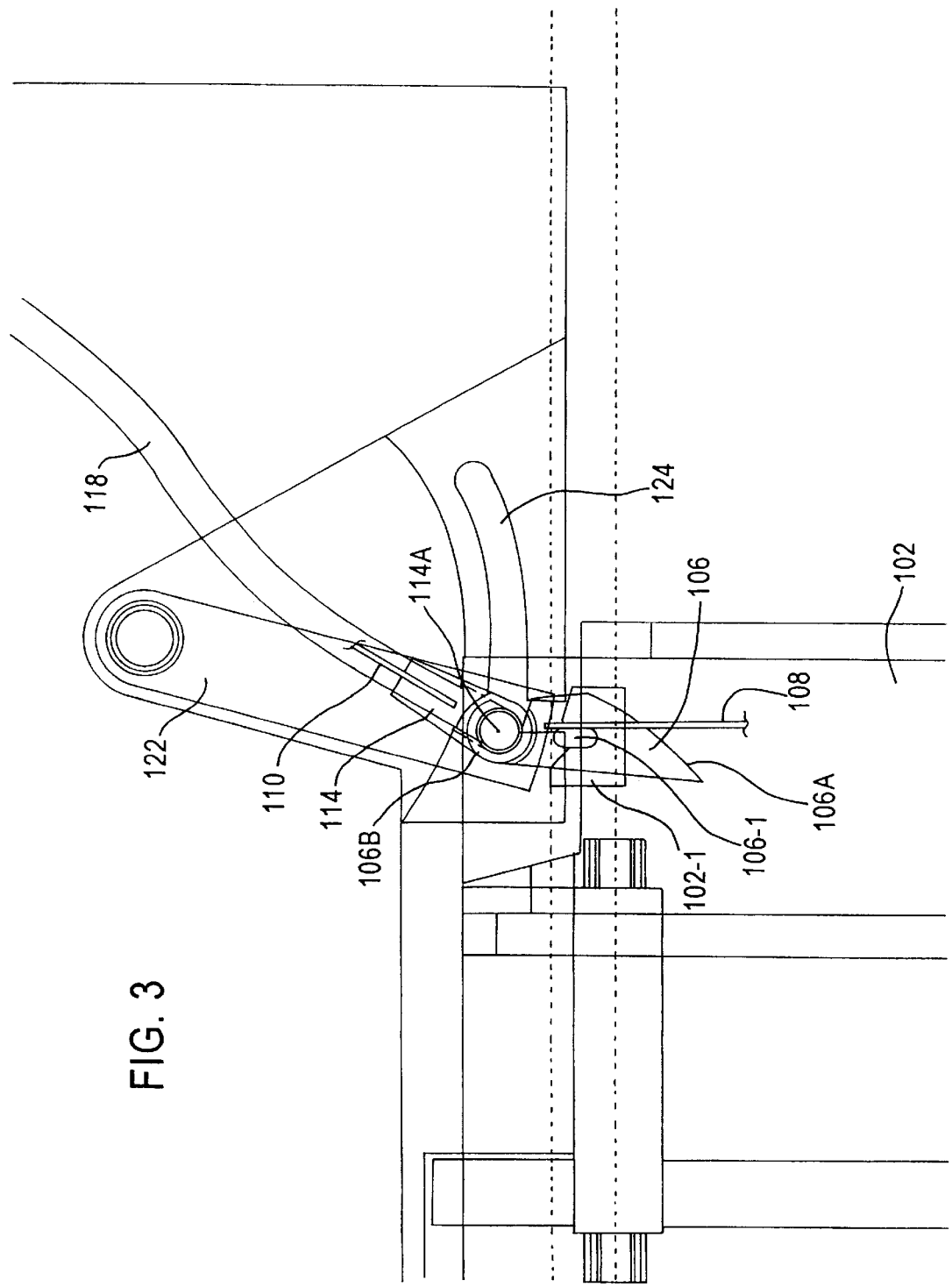
FIG. 3 is similar to that of FIG. 2, but shows the take-up and cartridge links in an interconnected state.
Figure 4:
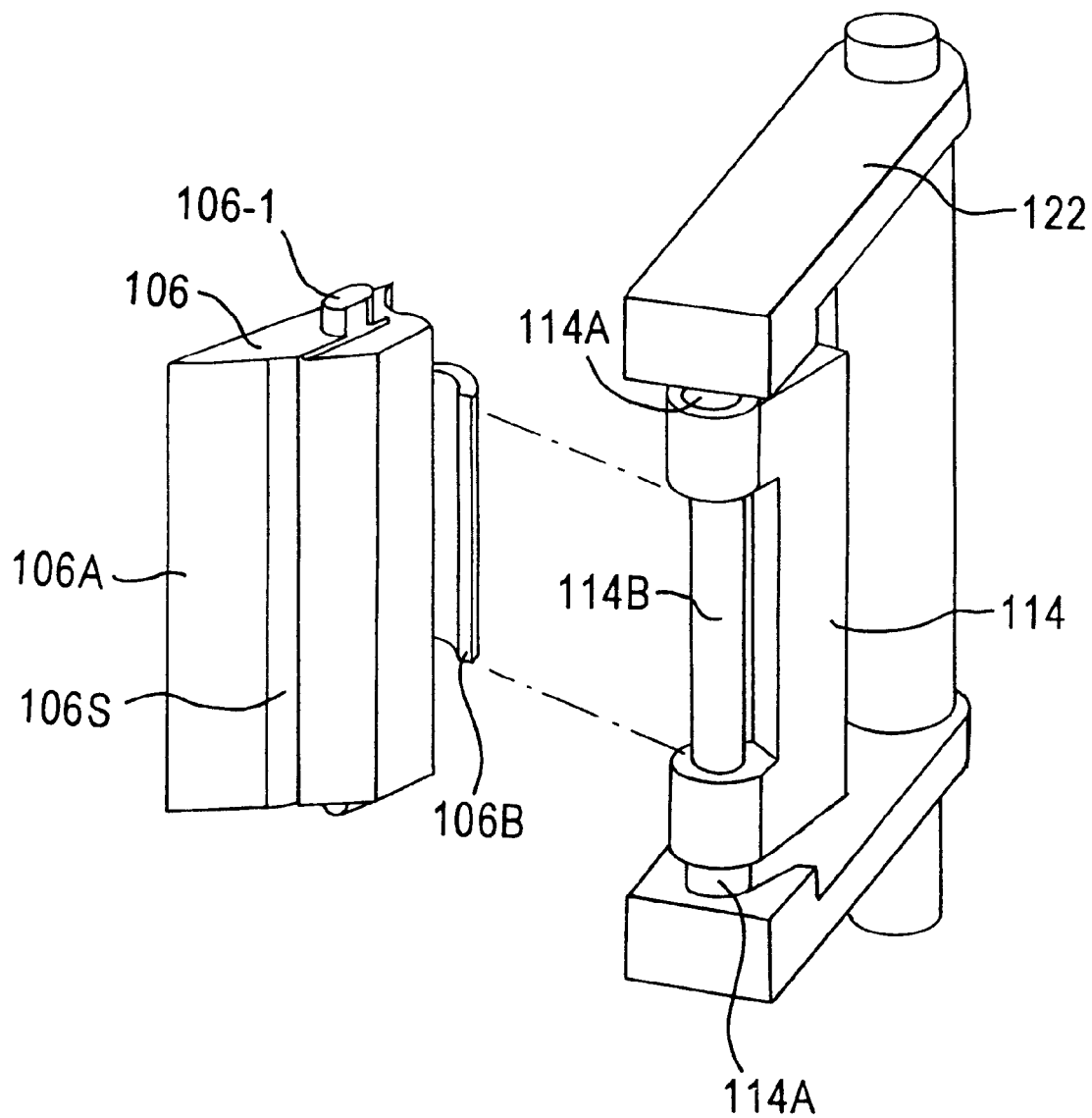
FIG. 4 is a perspective view showing the take-up link supported in the take-up link load arm ready to be swung into an engagement with the cartridge link.

However, prior to reaching the recess, the take-up link 114 is be securely coupled to the cartridge link 106 which, in this particular embodiment, is achieved through the use of the above mentioned connection mechanism 116. In this arrangement, connection mechanism 116 includes a link load arm 122 which is, as shown in FIGS. 2 and 3, pivotal between a disconnect position (FIG. 2), and a connect position (FIGS. 1 and 3), under the control of a load motor. In this arrangement, the link guide track 118 is arranged to lead the take-up link 114 back from the position wherein it has intercoupled with the cartridge link, to the outer take-up hub 112B. A loading guide track 124 is also formed in link guide plates 119 (only one is shown) and arranged to receive guide pins 114A which extend above and below the take-up link 114. A load motor selectively pivots the link load arm 122, to shunt the take-up link 114 between the above mentioned connect and disconnect positions.

Figure 5:
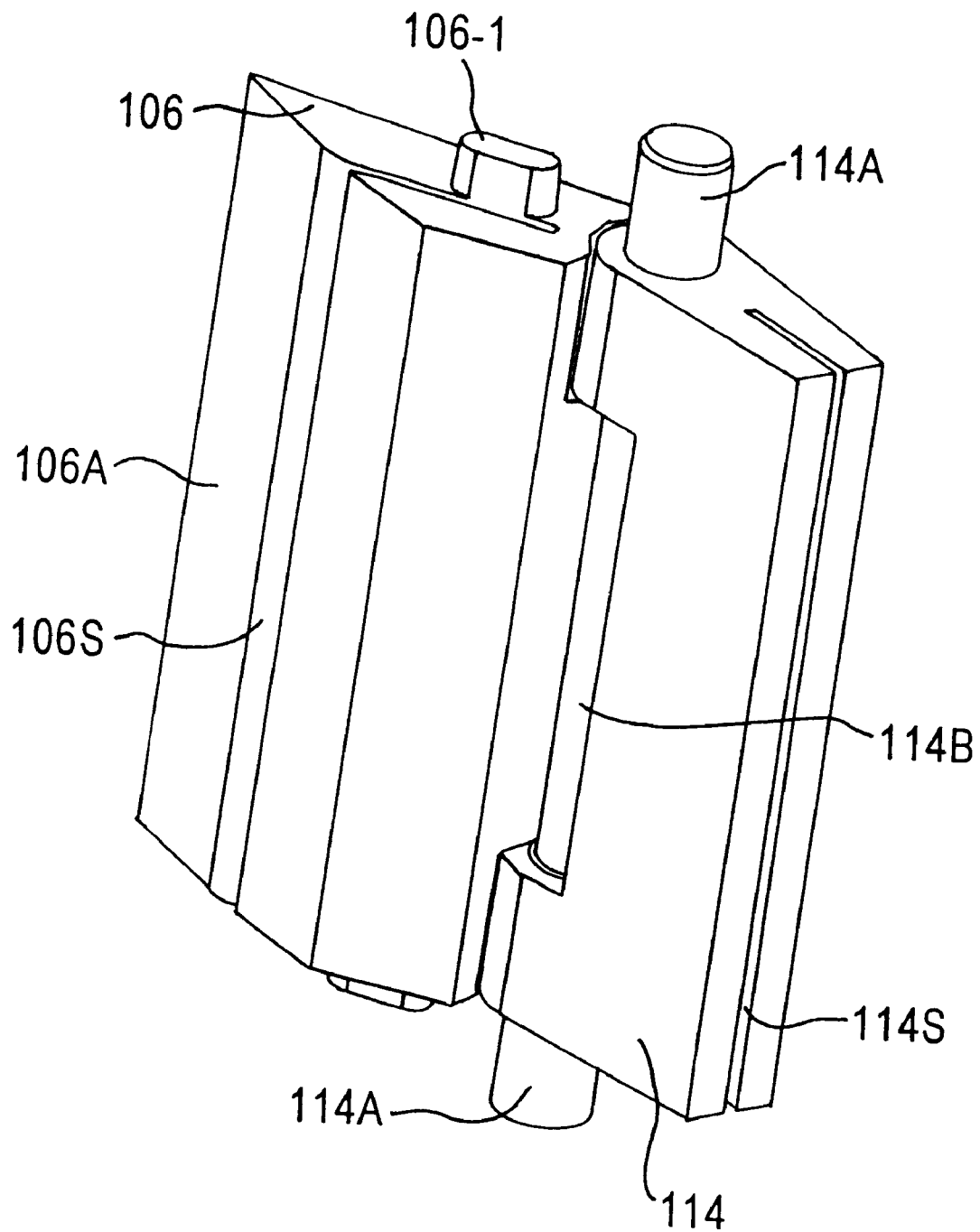
FIG. 5 is a perspective view showing the cartridge and take-up links in a fully engaged state.
Figure 6:
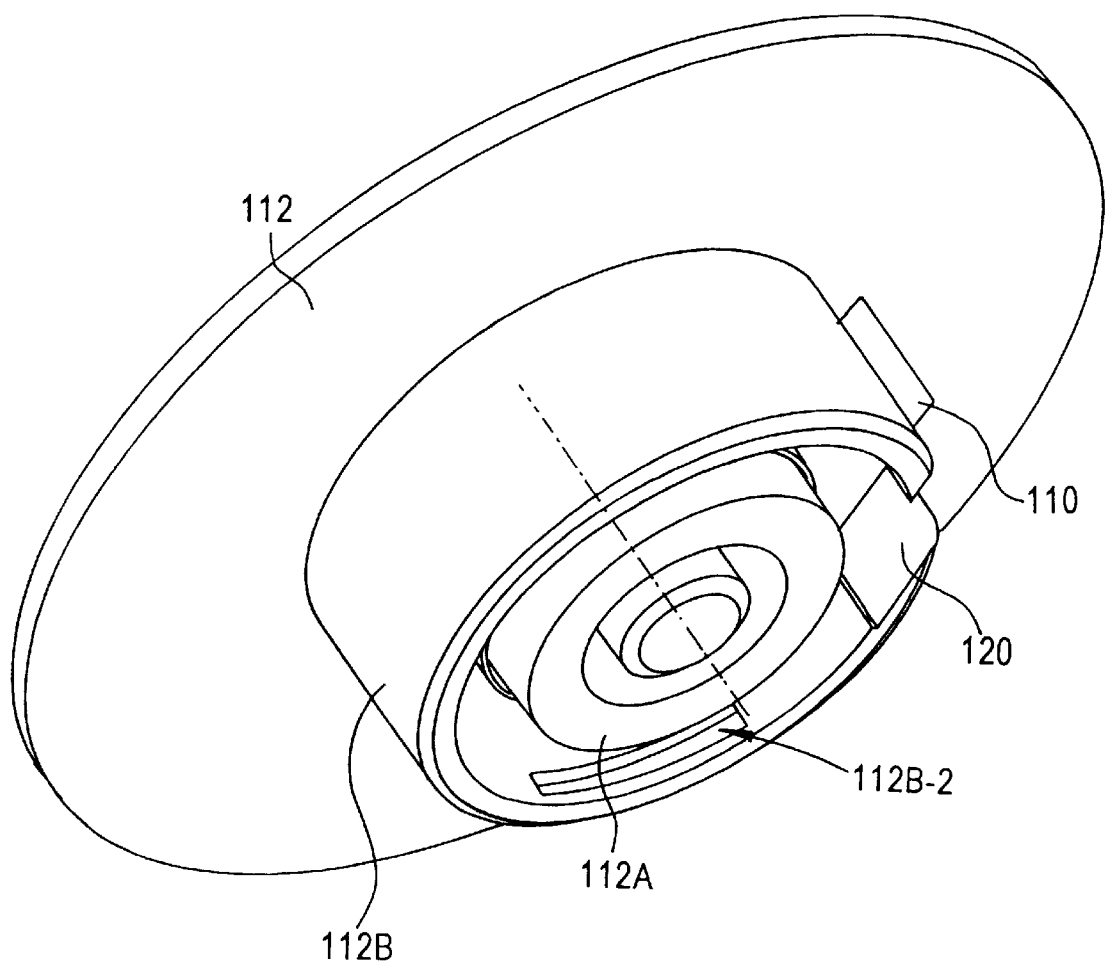
FIG. 6 is a perspective view of an upper portion of a take-up hub according to the present invention.

The actual interconnection between the take-up link 114 and the cartridge link 106 is, in this embodiment, achieved by forming the cartridge link 106 with an elongate curved clip-like hook member 106B at its leading edge (see FIG. 4) and the take-up link 114 with a shaft portion 114B. The clip-like hook member 106B is, as shown in FIGS. 2 and 3, arranged to open toward a recess formed in a side of the cartridge, in readiness to capture the shaft 114B of the take-up link 114. In this embodiment, the shaft has extensions (see FIG. 5) which project above and below the upper and lower edges of the link so as to act as the above mentioned guide pins 114A.

The cartridge and take-up links 106 and 114 are made of a suitably rigid plastic material and are formed with slots 106S and 114S in which the cartridge and take-up leaders 108, 110 are inserted and fixedly connected using a suitable fastening technique.

The operation of this embodiment is such that when the cartridge 102 is loaded into an operative position within the drive 100, the link load arm 114 is in the disconnect position (FIG. 2). The load motor, or the like type of mechanism, is then used to swing the link load arm 114 to the position shown in FIG. 3, wherein the shaft 114A engages in the hook member 106B of the cartridge link 106. It will be noted that the hook member 106B is arranged to be slightly flexible and to provide a slight snap when the shaft 114A is pressed into engagement therewith. This of course, provides a secure connection between the two links and ensures that an unwanted disconnection does not occur during tape loading. This snap of course should be also selected to enable a quick and easy disconnection when tape has been wound back into the cartridge 102 and the link load arm 114 is swung from the connect position to the disconnect position shown in FIG. 2.

Once a connection such as illustrated in FIG. 3 is established, the take-up reel 112 is rotated in a direction which winds the take-up leader 110 onto the inner hub 112A. This draws the intercoupled links 106, 114 along the guide tracks 118 and threads the cartridge leader 108 into an operative state within the drive 100. When the rear edge of the take-up link 114 enters the shaped recess 120 and abuts the stop feature 112B-2, the tension in the take-up leader 110 pulls the outer hub 112B and induces it to rotate synchronously with the inner one. At the same time, the cartridge leader 106 has assumed the condition shown in FIG. 9, wherein the recess 120 is filled with the intercoupled links, and the curved surface of the trailing edge 106A of the cartridge link 106 assumes a position wherein it effectively forms part of the cylindrical surface of the outer hub 112B.

As the outer hub 112B is drawn to rotate in unison with the inner hub 112A, the cartridge leader 108, and the magnetic tape which is attached to the end of the leader 108, is wind smoothly onto the outer hub 112B without any distortion and loss of circularity.

When the tape is no longer required for read/write operations, the process is reversed and the supply reel 104 is driven to reel the magnetic tape back into the cartridge 102. The intercoupled links 106, 114 are drawn out of the recess 120 and move back along the guide tracks 118 until the situation depicted in FIG. 3 is established. At this time, a positioning feature 106-1 provided on the upper edge of the cartridge link 106 is received in a positioning feature 102-1 formed on an inner surface of the cartridge 102. The load link arm 122 is located in the load position so that as the intercoupled links 106, 114 approach the cartridge 102, the guide pins 114A, which are sliding in the guide tracks 118, seat in position in the link load arm 122. The arm is then swung from the position shown in FIG. 3 to that shown in FIG. 2 thus sliding the guide pins 114A along the loading guide track 124 and pulling the shaft 114B out of the hook member 106B and dissolving the intercoupling between the two links 106, 114.

Although the present invention has been disclosed with reference to only a single basic embodiment, it will be noted that the present invention is not limited to these and is limited only by the scope of the appended claims. For example, the use of a separate leader between the tape in the cartridge and the cartridge link could be omitted and a portion of the magnetic tape per se could be used for this purpose. Further, it will be immediately self-evident to those skilled in the art of tape drives and tape handling, who are in possession of the knowledge imparted by the above disclosure that the hook and shaft on the cartridge and take-up links could be reversed or replaced with some outer suitable form of connection means.

What is claimed is:

1. A take-up reel for a tape drive, which take-up reel comprises:

an inner hub member operatively connected to a motor;

a flexible leader connected at a first end to the inner hub so as to be wound onto the inner hub when driven to rotate by the motor;

an outer hub member disposed about the inner hub and arranged to be freely rotatable thereabout, the outer hub having an opening through which the flexible leader extends;

capture means, including a link connected to a second end of the flexible leader, for capturing an end of a tape to be wound onto the outer hub; and stopper means provided on an inner surface of the outer hub for engaging the link of the capture means when the leader is wound onto the inner hub and for causing the outer hub to rotate synchronously with the inner hub.

2. A tape drive comprising:

an inner hub operatively selectively rotatable by a motor connected thereto;

an outer hub rotatably disposed about the inner hub and arranged to be freely rotatable with respect to the inner hub;

a flexible take-up leader having a first end connected to the inner hub and a second end connected to a take-up link member adapted to capture an end of a magnetic tape with guidance from a pivotably mounted load link arm, the take-up leader extending through an opening formed in the outer hub; and a recess between the inner and outer hubs which is contiguous with the opening in the outer hub and in which the take-up link member is received when the flexible take-up leader is wound onto the inner hub in a manner which allows the tape, which is drawn to the outer hub, to wind on the outer hub without circularity interference with the take-up link member.

3. The tape drive as set forth in claim 2, further comprising:

means for receiving a cartridge in which the magnetic tape is stored, a cartridge connector connected to an end of the magnetic tape, and connection means for connecting the cartridge connector to the take-up link member.

4. The tape drive as set forth in claim 3, wherein the cartridge connector comprises a cartridge link and a flexible leader which interconnects the cartridge link with the tape.

5. The tape drive as set forth in claim 4, wherein the connection means includes the link load arm pivotally mounted in the drive and arranged to move the take-up link between a connect position wherein connection between the take-up link and the cartridge link is established, and a disconnect position, wherein the take-up link is moved away from a loading position assumed by the cartridge link when a cartridge is inserted into the drive.

6. The tape drive as set forth in claim 4, wherein the cartridge link is formed with a curved surface which, when coupled with the take-up link and drawn into the recess defined between the inner and outer hubs, becomes essentially contiguous with an outer periphery of the outer hub and facilitates the smooth undulation free winding of the tape onto the outer hub.

7. The tape drive as set forth in claim 5, wherein the connection means further includes a guide track leading from the outer hub to the loading position; and a loading guide track extending between the connect position and the disconnect position.

8. The tape drive as set forth in claim 7, wherein the take-up link includes a guide pin which slides in the guide track and in the loading track.

9. The tape drive as set forth in claim 8, wherein one of the cartridge link and the take-up link is formed with a hook member, and wherein the other of the cartridge link and the take-up link is formed with a shaft member engageable in the hook member to establish a pivotal connection between the cartridge link and the take-up link.

10. The tape guide as set forth in claim 9, wherein the take-up link is formed integrally with the shaft member, and wherein the shaft member extends beyond a main body of the take-up link member forming the guide pin.

11. An apparatus for loading a tape having a leader, comprising a rotatable take-up hub assembly for operative connection to a motor; and means coupled to the hub assembly configured for capturing the leader of the tape to be wound onto the hub assembly and for substantially circularly winding the tape on an outer periphery of the hub assembly when the hub is driven by the motor.

* * * * *